United States Patent [19]

Zander

[11] 4,098,195

[45] Jul. 4, 1978

[54] TRANSPORTATION SYSTEM FOR THE DISTRIBUTION OF ARTICLES TO SEVERAL RECEIVING STATIONS ALONG A TRACK

[75] Inventor: Karl-Heinz Zander, Böblingen, Germany

[73] Assignee: Büro Patent AG, Glarus, Switzerland

[21] Appl. No.: 765,601

[22] Filed: Feb. 4, 1977

[30] Foreign Application Priority Data

Feb. 6, 1976 [CH] Switzerland .......................... 1490/76
Feb. 6, 1976 [CH] Switzerland .......................... 1491/76

[51] Int. Cl.² .............................................. B61K 1/00
[52] U.S. Cl. ..................................... 104/88; 198/370; 198/473; 198/679; 198/680; 214/11 R
[58] Field of Search ................. 104/88, 89, 96, 93–94; 105/148, 155; 198/680, 473, 477, 472, 370, 351, 353, 355, 678, 350, 352, 544, 368, 369, 690, 679, 680; 294/65.5; 214/1 BS, 11 R, 60; 24/67.7, 67.5, 67.3, 253, 252 R, 81 GS, 81 PC, 263 R, 262 R, 263 B, 263 SB; 211/45, 46, 47, 89, 124

[56] References Cited

U.S. PATENT DOCUMENTS

| 3,011,455 | 12/1961 | Heimann | 104/96 |
|---|---|---|---|
| 3,235,101 | 2/1966 | Milhaupt | 214/11 R |
| 3,499,518 | 3/1970 | Goodpaster | 198/369 |
| 3,680,173 | 8/1972 | Martin | 198/680 |
| 3,884,370 | 5/1975 | Bradshaw | 104/88 |

*Primary Examiner*—Galen L. Barefoot
*Attorney, Agent, or Firm*—Karl F. Ross

[57] ABSTRACT

A self-propelled carriage traveling along a track, e.g. within a printing plant, carries a number of flat articles such as printing forms suspended from a common supporting bar with the aid of releasable holders gripping that bar in transversely spaced engagement positions. As the carriage passes a receiving station such as a printing press constituting the destination of one or more of these articles on one holder, a magnetic retreiver aligned with the corresponding engagement position releases the holder from the bar and lets it drop onto a transverse guide rod sloping down to an unloading point. The holder may include a locking mechanism for securing the article or articles in place during travel, an extension of this mechanism preventing the mounting of the holder on the supporting bar in an unlocked position.

32 Claims, 11 Drawing Figures

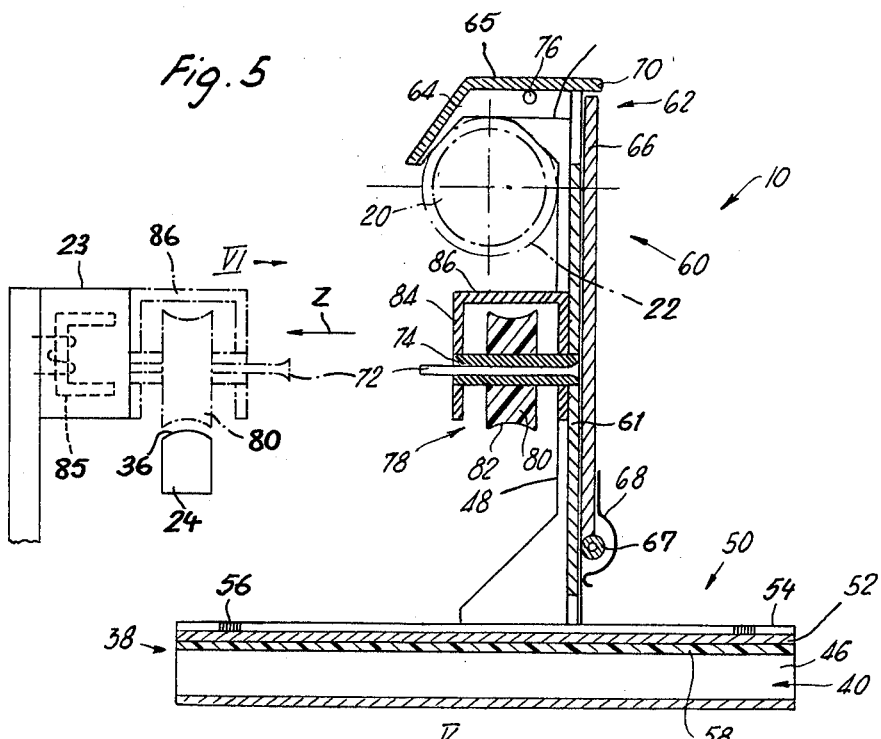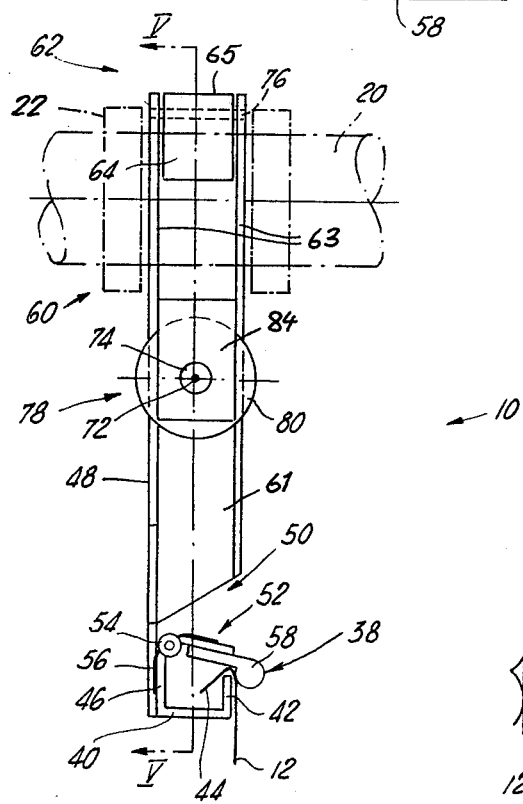

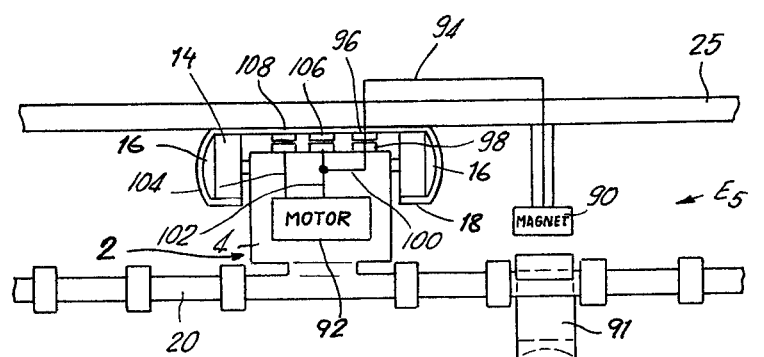
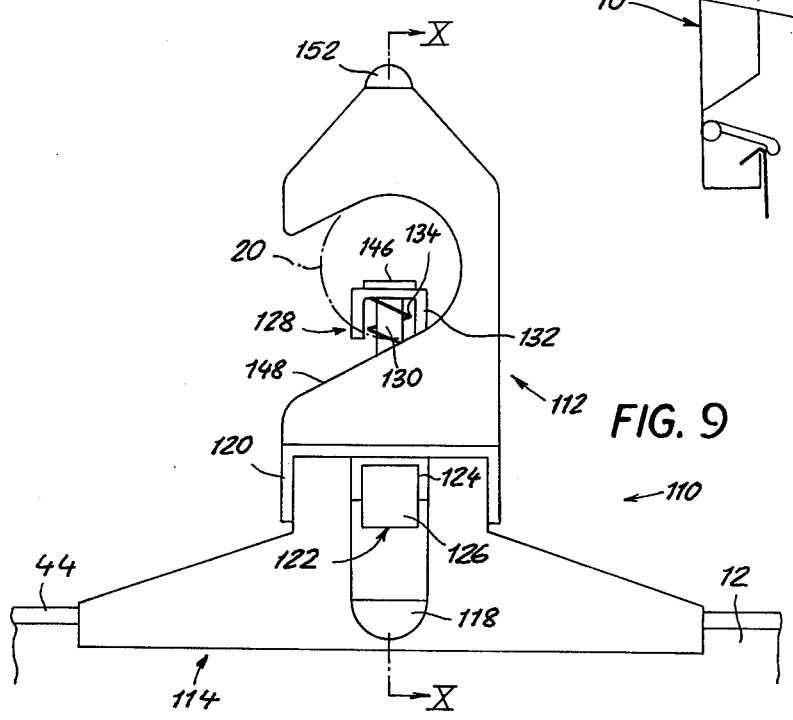
FIG. 8
FIG. 9

TRANSPORTATION SYSTEM FOR THE DISTRIBUTION OF ARTICLES TO SEVERAL RECEIVING STATIONS ALONG A TRACK

FIELD OF THE INVENTION

My present invention relates to a transportation system designed to distribute various articles to a number of destinations, especially within an office or a factory in which such articles originate at a central dispatch area and must be delivered to a multiplicity of receiving stations.

BACKGROUND OF THE INVENTION

Transportation systems of this general type are known, for example, from U.S. Pat. Nos. 3,340,821, 3,502,038 and 3,636,883. Such a system, as described in these earlier patents, may comprise one or more transporters in the form of self-propelled carriages riding on an endless track past the several receiving stations. The carriages may be provided with destination-indicating code markings for the selective closure of circuits, e.g. with the aid of magnetic switches, which control the shunting of an oncoming carriage onto a siding at the desired receiving station.

Such an internal transportation system is useful in many enterprises in which stacks of paper or other relatively bulky articles are to be sent from one station to another. For simpler articles such as individual sheets or plates, or for sensitive goods which must not be bunched or stacked, the use of an entire carriage destined for a single receiving station is cumbersome and uneconomical. In a printing plant of a major newspaper, for example, forms prepared in the composing room must be quickly delivered to respective offset machines at a number of printing stations, these forms requiring careful handling during transportation.

OBJECTS OF THE INVENTION

An important object of my present invention, therefore, is to provide a transportation system of the general character referred to which allows individual articles to be automatically unloaded at predetermined destinations from a carriage proceeding without interruption along a path that leads it past all the receiving stations to which such articles are to be delivered.

A more particular object is to provide simple and effective means for releasably holding the transported articles on such a carriage.

A further object is to provide means at each receiving station for uniquely retrieving from an oncoming carriage an article destined for that particular station.

A more specific object is to provide a system of this character adapted for the transportation of printing forms or the like.

SUMMARY OF THE INVENTION

In accordance with my present invention, a transporter movable along a path formed by suitable track means is provided with support means, preferably a horizontal rod transverse to the direction of travel, forming a plurality of predetermined engagement positions for articles headed for different destinations along the track, these engagement postitions being transversely spaced with reference to the transport path. Each destination comprises retrieval means aligned with the respective engagement position for automatically releasing a corresponding article from the support means as the transporter moves past, the retrieval means being juxtaposed with guide means such as a sloping transverse bar for directing a released article to a receiving station.

In principle, the articles may be carried directly on the support means of the transporting carriage. According to a more particular feature of my invention, however, I prefer to provide holders designed to grip the supporting rod in any of its engagement positions and adapted to carry a single article or several articles having a common destination. In either case, that destination is uniquely determined by the engagement position in which the article or its holder is placed on the carriage.

Pursuant to a further feature of my invention, a holder for one or more such articles is provided with forwardly open hook means fitting onto the supporting rod so as to be readily stripped therefrom by the aforementioned retrieval means as the carriage approaches the destination of the article or articles suspended from that holder. The retrieval means may include an electromagnet, energized via suitable switch means whenever a carriage travels past the receiving station, which may either lift the hook of the holder off the supporting rod or simply immobilize that holder after it has been detached from the rod by a separate unlatching mechanism. In either instance the magnet should not be de-energized until the carriage has moved out of the way, the holder then dropping onto the above-mentioned sloping guide bar which it engages through a preferably grooved roller.

Still another feature of my invention resides in the provision of an abutment or bumper arresting the holder at the receiving station proper, in combination with a rocker ahead of that bumper which is engageable by the grooved roller in the arrested position of that holder to keep a further holder, sliding along the bar from the direction of the track, at a distance from the bumper and therefore from the first-mentioned holder. This is particularly important where the articles carried by the holders are printing forms which must be prevented from colliding with each other. The rocker also functions as a brake for the oncoming holder.

Yet a further feature of my invention concerns the provision of a locking mechanism for securely clamping the transported article to a mounting formed by the holder, advantageously in a position in which that article (if in the general shape of a plate) lies parallel to the transport direction. The locking mechanism may have an extension which projects toward the hook of the holder to prevent engagement of the supporting rod in an unlocked position, thereby insuring that each article is firmly held during transportation.

BRIEF DESCRIPTION OF THE DRAWING

The above and other features of my invention will now be described in detail with reference to the accompanying drawing in which:

FIG. 4 is an elevational view of a dispatching station forming part of the system of FIG. 1;

FIG. 5 is an enlarged cross-sectional view, taken on the line V — V of FIG. 6, of a holder designed for the transportation of a flat article on a carriage as shown in FIG. 2;

FIG. 6 is a front-elevational view of the holder illustrated in FIG. 5;

FIG. 7 is a detail view showing a modification of the lower part of FIG. 6;

FIG. 8 is a fragmentary elevational view of a carriage, drawn to a scale larger than that of FIG. 2;

FIG. 9 is a side-elevational view of an alternate holder adapted to be mounted on one of the carriages of FIG. 2;

SPECIFIC DESCRIPTION

Figure 1:
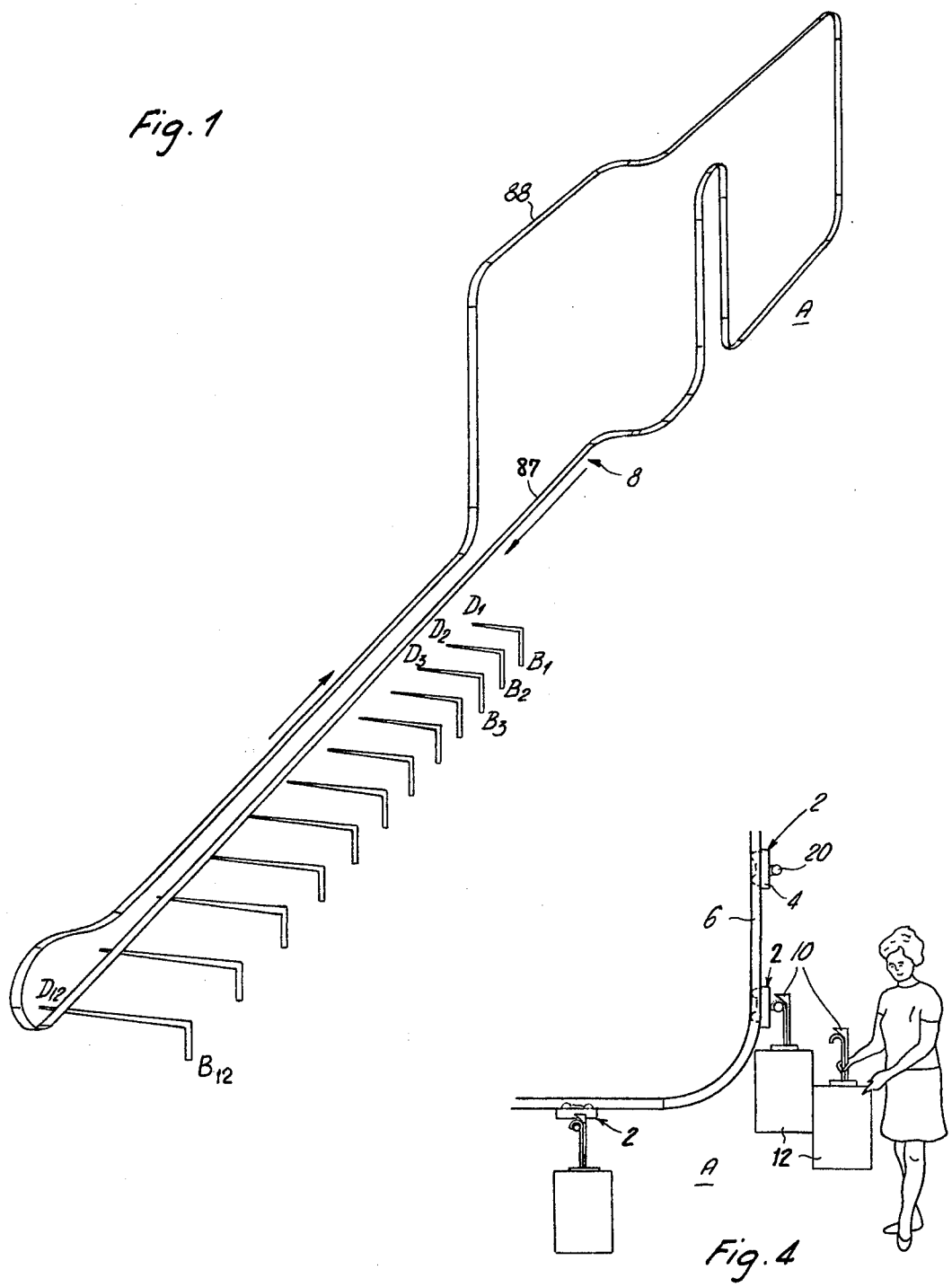
FIG. 1 is a perspective view illustrating, somewhat diagrammatically, a transportation system embodying my invention.
Figure 2:
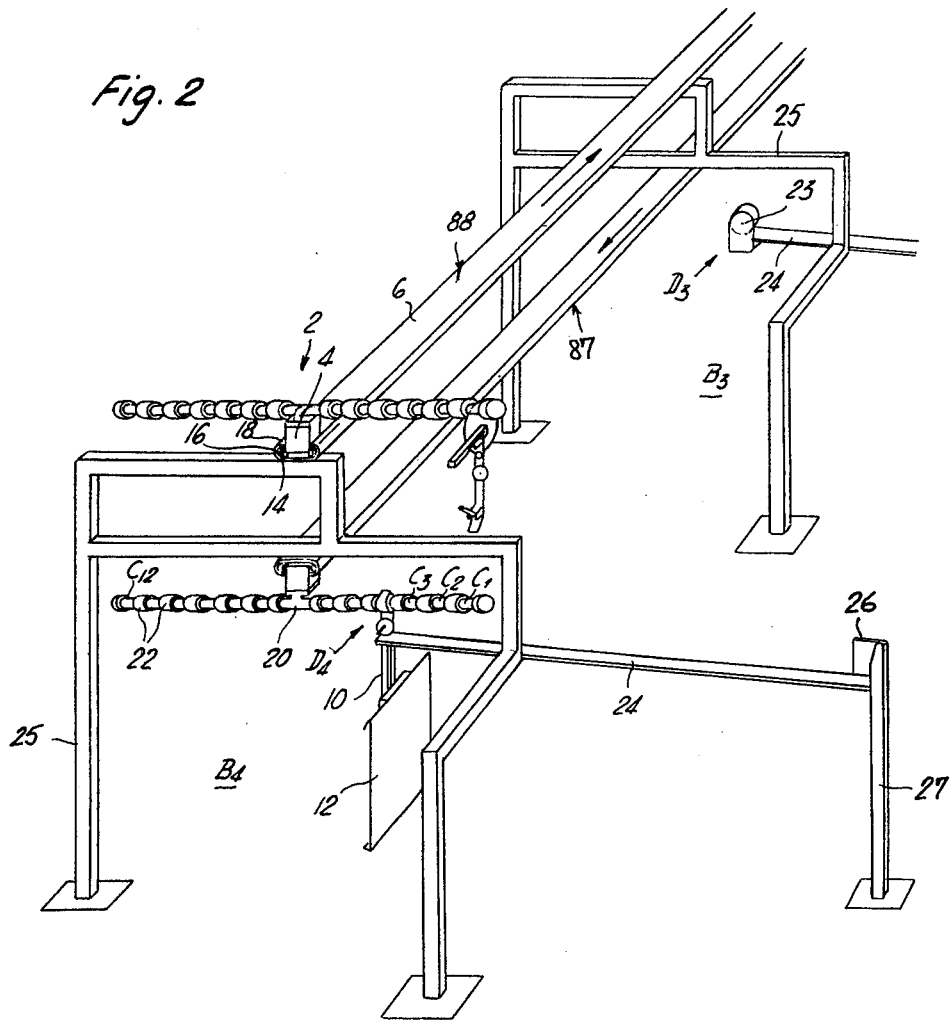
FIG. 2 is a more detailed perspective view showing two carriages and two receiving stations in the system of FIG. 1 on a larger scale.

In FIG. 1 I have shown the outline of a transportation system according to my invention, as used for example in a printing plant, comprising an endless track 8 for the circulation of a number of carriages 2 (FIGS. 2 and 4). Track 8 is formed by a rail 6 of U-shaped cross-section, substantially as shown in the aforementioned U.S. patents, whose lower and upper runs 87 and 88 may partially extend along the floor and the ceiling of a flight of rooms as well as along intervening wall surfaces. A dispatching station A (see also FIG. 4), which may be located in the composing room of the printing plant, serves for the manual loading of the carriages 2 with printing forms 12 that are to be distributed among a number of receiving stations $B_1$–$B_{12}$. Each carriage 2 is provided, for this purpose, with a corresponding number of engagement positions $C_1$–$C_{12}$ constituted by peripheral indentations between annular shoulders 22 of a transverse supporting rod 20 which is rigid with the body 4 of the carriage. The carriage body 4 is provided with two pairs of wheels 14 which are received with slight vertical clearance, as shown in prior U.S. Pat. No. 3,636,883, between a central web and overhanging flanges 18 of a pair of cheeks 16 forming part of the profile or rail 6. The carriages are self-propelled with the aid of an electric motor 92 (FIG. 8) whose energizing circuit includes leads 102, 104 terminating in brushes which sweep a pair of bus bars 106, 108 on the inner surface of the rail web, as likewise shown in the last-mentioned patent.

The articles 12 to be transported are mounted on holders 10 which, in a manner more fully described hereinafter, grip the supporting rod 20 in engagement positions assigned to their respective receiving stations. The holders 10 are so designed that the transported articles lie with their major surfaces in planes parallel to the track 8; this arrangement accommodates the largest number of printing forms on rod 20, reduces air resistance and minimizes the effects of possible collisions with extraneous objects. Receiving stations $B_1$–$B_{12}$ are provided with respective retrieval units $D_1$–$D_{12}$ which are transversely staggered, in line with the corresponding engagement positions of oncoming carriages, and are designed to remove the aligned holders 10 from supporting rod 20 in a manner presently to be described.

In FIG. 2 I have shown parts of two adjacent receiving stations $B_3$ and $B_4$. Each station comprises a track-supporting frame 25 rigid with an unloading bar 24 which lies in a plane transverse to the track and slopes downwardly from its vicinity toward a post 27 carrying a bumper 26 (see also FIG. 3). The elevated end of bar 24 carries a fixed stop 23 (illustrated only for station $B_3$) forming part of the corresponding retrieval unit such as $D_3$, $D_4$. The upper extremities of holders 10 have the shape of forwardly open hooks enabling them to be stripped off the rod 20 as the carriage 2 equipped with this rod continues on its course.

Figure 3:
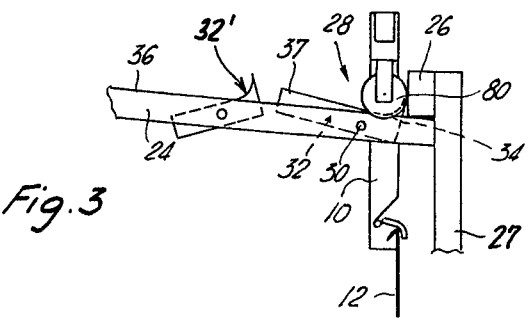
FIG. 3 is a fragmentary elevational view illustrating a detail of a receiving station.

As shown in FIG. 3 and described in more detail hereinafter, each holder 10 is provided beneath its hook-shaped extremity with a grooved roller 80 which comes to rest on the upper edge 36 of bar 24 after the hook is disengaged from the supporting rod 20. Holder 10, together with the printing form 12 carried by it, then travels by gravity toward the post 27 where its roller 80 is arrested by the bumper 26. A braking mechanism 28, disposed just ahead of bumper 26, comprises a rocker 32 which is pivotally mounted in a central vertical slot of bar 24 at a fulcrum 30 dividing that rocker into a shorter arm 34 and a longer, heavier arm 37. Normally, when no holder 10 sits at the lower end of bar 24, arm 37 is depressed by its own weight while arm 34 rises above the guide edge 36 as has been illustrated for a similar rocker 32' preceding the rocker 32. The arrival of a holder 10 in the position shown in FIG. 3 causes its roller 80 to depress the enlarged free end of arm 34 whereby the free end of arm 37 is elevated above the guide surface 36 to act as a stop for another holder coming down along bar 24 after having been disengaged from a different carriage. This second holder, not shown, then reverses the rocker 32' in an analogous manner whereby a third holder is arrested still farther up the bar 24. In this way, contact between printing forms 12 successively discharged at the same receiving station is positively prevented. Naturally, the number of cascaded rockers 32, 32' can be increased if desired.

Since the lowering of the short rocker arm 34 by the roller 80 of an oncoming holder 10 requires a certain force, that rocker also acts as a brake which decelerates the holder to minimize the impact of its collision with bumper 26.

Reference will now be made to FIGS. 5 and 6 showing structural details of a holder 10 engaging a supporting rod 20 between shoulders 22 thereof, the shoulders acting as barriers between adjacent engagement positions for different holders. The lower part of holder 10 forms a mounting 38 for a printing form 12, this mounting comprising a J-profile 40 which is perpendicular to rod 20 and therefore extends parallel to the direction of travel. Profile 40 has two vertical flanges 42 and 46, flange 42 forming a ridge overlain by a bent-over lip 44 of plate 12 which is pressed against that ridge by a clamping mechanism 50. That mechanism comprises a pressure member 52 which is hinged at 54 to flange 46 and is urged by springs 56 into contact with the ridge of flange 42 through the intermediary of a resilient pad 58. In this clamped position, plate 12 is suspended by its lip 44 adjacent flange 42 while being entrained from right to left as viewed in FIG. 5 (arrow Z). Profile 40 is fixedly secured by its flange 46 to a strut 48 forming part of the holder body.

As illustrated in FIG. 7, mounting 38 could be replaced by a modified mounting 38a comprising an L-profile 40a whose horizontal leg is formed with a longitudinal slot 39 open at one end. A plate 12, topped by a cylindrical head 41, could thus be slid endwise into the slot 39 for engagement by a resilient pad 58a of a pressure member 52a loaded by one or more springs 56a.

The upper part of holder 10, FIGS. 5 and 6, comprises a hook-shaped gripper 60 including an upright 61 rigid with strut 48. Upright 61 has lateral flanges 63 to which an elbow 65 is hinged by a pin 76, this elbow overhanging the supporting rod 20 of an associated carriage moving in the direction of arrow Z. Elbow 65 has a depending front arm 64 by which it embraces the rod 20 from above while a rearwardly extending spur 70 is immobilized by a latching mechanism 62 including a bar 66 which is hinged at 67 to upright 61 and is urged by a spring 68 into its illustrated vertical position.

Bar 66 is in contact with a horizontal pin 72 which axially traverses a shaft 74 of roller 80, the latter being here clearly shown to have a peripheral groove 82 whose curvature matches that of the convex guide surface 36 of bar 24. Roller shaft 74 is horizontally mounted in a bracket 86 of inverted-U profile, a free end of pin 72 projecting forwardly from an outer web 84 of bracket 86 so as to confront the stop 23 of the retrieval unit to which the holder is assigned by virtue of its emplacement in a particular engagement position of rod 20. As the carriage passes through the corresponding receiving station, stop 23 represses the pin 72 whereby latching bar 66 is thrust rearwardly, against the force of its biasing spring 68, to release the spur 70 of elbow 65. This allows the elbow to swing clockwise (as viewed in FIG. 5) about its fulcrum 76, thus letting the rod 20 escape underneath front arm 64 as the carriage continues along its path while holder 10 is arrested by its contact with stop 23. That stop comprises an electromagnet 85 which is energized upon the approach of the carriage and firmly attracts the ferromagnetic web 84, thereby immobilizing the holder 10 in a position in which its roller 80 is precisely aligned with the underlying guide bar 24 as illustrated in dot-dash lines. After a time sufficient to let the carriage move fully out of the way, magnet 85 is de-energized whereupon holder 10 falls free for a very short distance until its roller 80 comes to rest on guide surface 36 on which it is balanced as the holder descends toward post 27 (FIGS. 2 and 3). The temporary energization of magnet 85 is advantageously brought about by the carriage itself, substantially in the manner described hereinafter with reference to FIG. 8.

As illustrated in FIG. 8, a different retrieval unit E comprises an electromagnet 90 positioned to overlie a modified hook 91 of a holder 10' otherwise similar to the holder 10 of the preceding Figures. Hook 91 is of unitary construction and consists of ferromagnetic material so as to be lifted up by the magnet 90 which is energized just as the holder 10' passes underneath. The energizing circuit of magnet 90 comprises a lead 94 which extends from an ancillary bus bar 96 disposed adjacent the aforedescribed bus bars 106 and 108, bus bar 96 being of limited length and confined to the region of the associated receiving station. An extension 100 of lead 102 terminates in a brush 98 which contacts the bus bar 96 as the carriage 2 traverses the station, thereby transmitting voltage from the externally energized bus bar 106 to bus bar 96 and thence through lead 94 to a terminal of magnet 90 whose other terminal is grounded by the frame 25 on which it is supported. Again, the de-energization of the magnet following the departure of carriage 2 allows the holder 10' to drop a small distance, letting its roller 80 alight on the sloping bar 24 for transportation to the unloading point adjacent post 27.

Figure 10A:
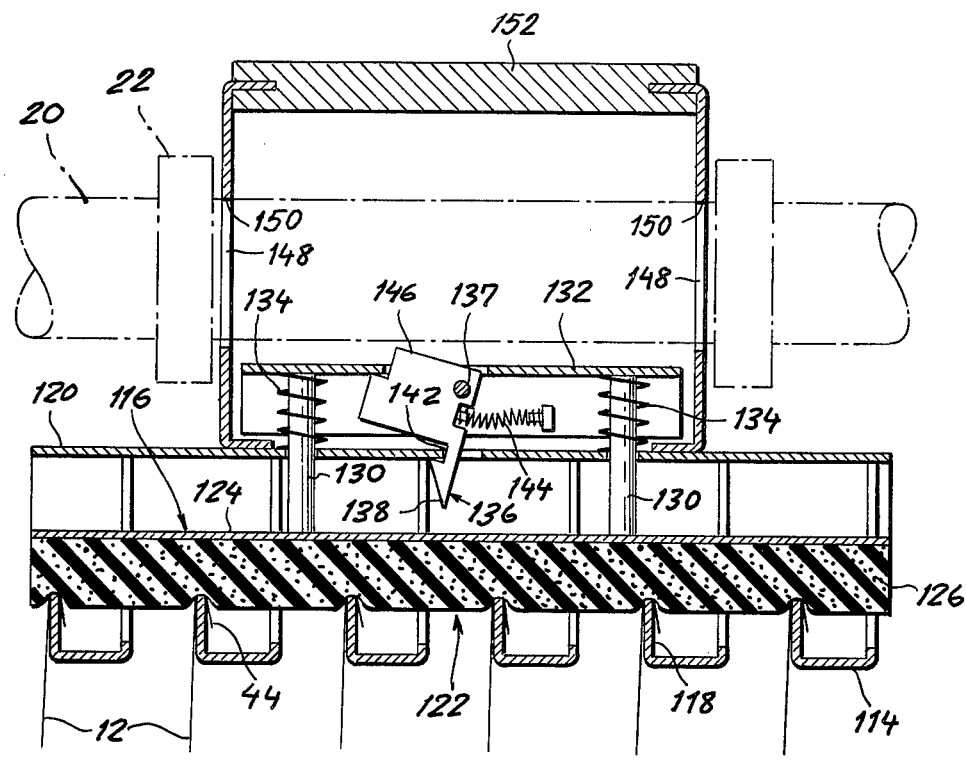
FIG. 10A is a cross-sectional view of the holder of FIG. 9, taken on the line X — X thereof and showing a clamping mechanism on the holder in working position.
Figure 10B:
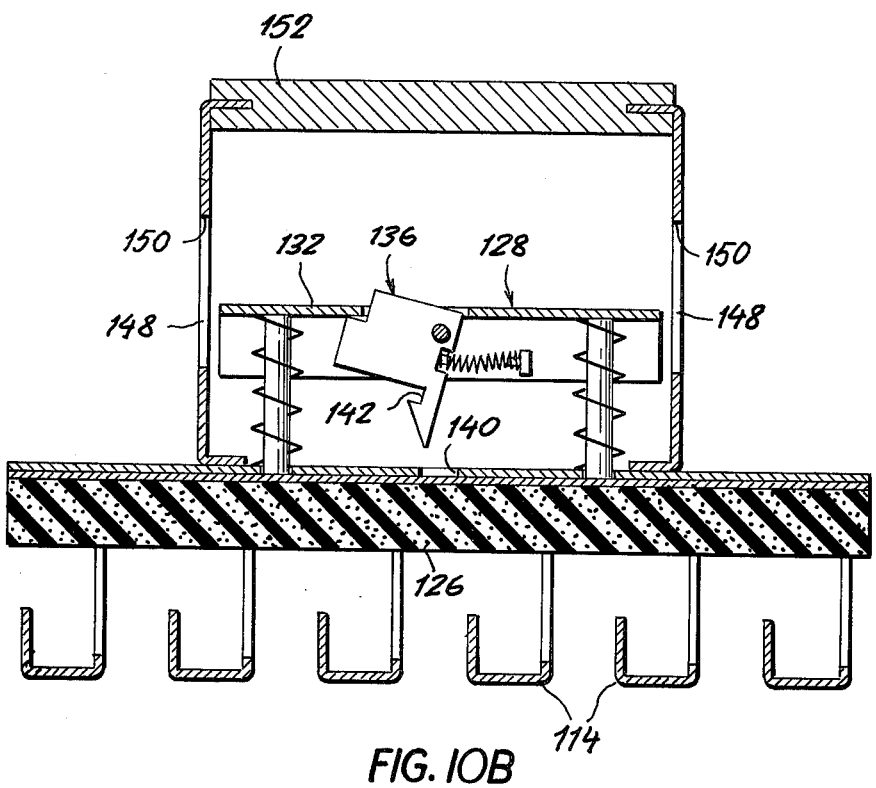
FIG. 10B is a view similar to FIG. 10A, showing the holder with the clamping mechanism released.

In FIGS. 9, 10A and 10B I have shown an alternate holder 110 with a hook-shaped extremity 112 topped by a handgrip 152. The handgrip may be made of ferromagnetic material and adapted to coact with an electromagnet 90 as described with reference to hook 91 of FIG. 8.

In contradistinction to the holders 10 and 10' referred to above, holder 110 is designed to carry several (here six) printing forms 12 underneath its rod-gripping extremity 112. The holder is provided for this purpose with a corresponding number of J-profile mountings 114, generally similar to profile 40 of FIGS. 5 and 6, with upstanding flanges 118 forming ridges engageable with bent-over lips 44 of plates 12 as described above. A clamping mechanism 116, whose working position has been illustrated in FIG. 10A, securely holds the plates 12 on their mountings 114 with the aid of a pressure member 122 comprising a profile 124 of inverted-U shape and an elongate elastic pad 126, e.g. of foam plastic.

Mountings 114 are secured to a frame 120 which is rigid with hook structure 112 and guides the clamping mechanism 116, the latter comprising a pair of vertical stems 130 which project upwardly through the top of frame 120 and are bridged by a beam 132 of inverted-U profile forming part of a blocking device 128. A latch 136, pivoted to beam 132 at 137, has a lug 138 with an undercut 142 into which snaps an edge of a cutout 140 of frame 120 when the beam 132 is lowered against the pressure of biasing springs 134, surrounding the stems 130, to clamp the plates 12 between mountings 114 and pad 126. Latch 136 is held in this locking position by a compression spring 144 anchored to beam 132. In order to release the latch, the user depresses a land 146 remote from pivot 137 to restore the unlocking position shown in FIG. 10B in which the plates 12 are released and can be removed from their mountings 114. In the unlocking position of FIG. 10B, beam 132 projects into the mouth of hook portion 112 as also seen in FIG. 9, thereby preventing the emplacement of holder 110 on a rod 20 of a carriage 2; the forms 12, therefore, cannot be dispatched unless they are firmly engaged by their holder.

As further shown in FIGS. 10A and 10B, hook portion 112 has a pair of sidewalls with apertures 148 for the rod 20, these sidewalls resting on the rod by axially separated edges 150 to insure a stable support of the holder on the transporting carriage.

It will be understood that the clamping mechanism 116 could also be used with a holder 10 or 10' for a single article 12 as shown in FIGS. 5–8.

I claim:

1. A system for distributing impact-sensitive articles to a number of destinations, comprising:
    track means forming a path leading past all said destinations;
    at least one transporter movable along said path;
    support means on said transporter including a transverse rod formed with a plurality of predetermined engagement positions for articles respectively headed for said destinations, said engagement positions being transversely spaced with reference to said path;
    holders emplaceable on said rod in any of said engagement positions, each holder being adapted to carry at least one article;
    hook means on each holder fitting onto said rod in a forwardly open position for disengagement therefrom by relative rearward motion;

retrieval means at each destination aligned with the respective engagement position for arresting a corresponding holder with resulting release of said hook means from said rod upon movement of said transporter past said retrieval means; and guide means at each destination juxtaposed with said retrieval means for directing a released holder to a receiving station, said retrieval means including retaining means synchronized with the movement of said transporter for temporarily immobilizing a released holder in an elevated position just above said guide means.

2. A system as defined in claim 1 wherein said transporter comprises a self-propelled carriage.

3. A system as defined in claim 2 wherein said track means comprises a pair of parallel rails of generally U-shaped cross-section, said carriage being provided with wheels embraced by said rails.

4. A system as defined in claim 1 wherein said rod has longidudinally spaced stops separating said engagement positions.

5. A system as defined in claim 1 wherein said retaining means comprises a magnet positioned for coaction with a ferromagnetic part of any of said holders suspended from said bar in an aligned engagement position.

6. A system as defined in claim 5 wherein said magnet is provided with an electrical energizing circuit including switch means closable by said transporter during travel thereof past said retrieval means.

7. A system as defined in claim 6 wherein said transporter is a self-propelled carriage provided with an electric motor, said track means including a supply conductor extending along said path for feeding current to said motor, said energizing circuit including an ancillary conductor extending alongside said supply conductor in the vicinity of said retrieval means, said switch means comprising a pair of interconnected brushes on said carriage respectively positioned for contact with said supply conductor and said ancillary conductor.

8. A system as defined in claim 6 wherein said magnet is disposed above the trajectory of an aligned holder for lifting said hook means thereof off said rod.

9. A system as defined in claim 6 wherein said retrieval means comprises a fixed stop confronting an oncoming holder aligned therewith, said magnet being part of said stop.

10. A system as defined in claim 1 wherein each holder is provided with a roller centered on an axis substantially transverse to said rod upon suspension of the holder from said rod by said hook means, said guide means comprising a bar substantially transverse to said path disposed below the trajectory of said roller for intercepting said roller upon release of the holder from said rod.

11. A system as defined in claim 10 wherein said bar slopes downwardly toward said receiving station from the vicinity of said path.

12. A system as defined in claim 11 wherein said bar is provided at said receiving station with an abutment for arresting the corresponding holder and with at least one rocker ahead of said abutment engageable by said roller in the arrested position of the holder for keeping a further holder, sliding along said bar from said path, at a distance from said abutment.

13. A system as defined in claim 1 wherein said hook means comprises an upright, an elbow with a depending front arm articulated to the top of said upright, latch means on said upright normally keeping said elbow in a generally horizontal position overhanging said rod upon suspension of the holder from said rod, and a forwardly pointing release member operatively coupled with said latch means for allowing said elbow to swing upwardly and lift said front arm off said rod upon contact of said release member with a stationary element forming part of said retrieval means.

14. A system as defined in claim 13 wherein each holder comprises a bracket underneath said hook means and a roller journaled in said bracket for rotation about an axis which is substantially transverse to said rod upon engagement of said rod by said upright and said elbow, said roller having a tubular shaft traversed by said release member, said guide means comprising a bar substantially transverse to said path disposed below the level of said bracket for intercepting said roller upon release of said elbow from said retaining means.

15. A system as defined in claim 14 wherein said bracket is at least partly ferromagnetic, said retaining means including an electromagnet energizable upon the approach of said transporter for temporarily immobilizing an aligned holder upon release thereof from said rod with said roller overlying said rod.

16. A system as defined in claim 1 wherein each holder is provided, beneath said hook means, with a mounting for at least one article to be transported and with locking means for clamping such an article against said mounting.

17. A system as defined in claim 16 wherein said mounting forms an upstanding ridge coacting with said locking means.

18. A system as defined in claim 16 wherein said mounting comprises a slotted plate coacting with said locking means.

19. A system as defined in claim 16 wherein said locking means comprises a pressure member provided with a resilient pad confronting said mounting.

20. A system as defined in claim 19 wherein said locking means further comprises spring means urging said pad toward said mounting.

21. A system as defined in claim 19 wherein said locking means further comprises a vertically movable frame carrying said pressure member, biasing means urging said frame away from said mounting, and detent means for releasably holding said frame in a clamping position against the force of said biasing means.

22. A system as defined in claim 19 wherein said mounting forms seats for a plurality of articles, said pressure member overlying all said seats.

23. A system as defined in claim 16 wherein said locking means is provided with an extension projecting toward said hook means for preventing engagement thereof with said rod in an inoperative position of said locking means.

24. A system as defined in claim 1 wherein said mounting forms an elongate seat for an article to be transported, said seat being parallel to said path upon suspension of the holder from said rod.

25. A system as defined in claim 1 wherein each holder is provided with a handgrip.

26. A system as defined in claim 1 wherein said hook means forms two parallel contact edges engageable with said rod at spaced-apart locations.

27. A system for distributing various articles to a number of destinations, comprising:

track means forming a path leading past all said destinations;

at least one self-propelled carriage movable along said path and provided with an electric motor, said track means including a supply conductor extending along said path for feeding current to said motor;

support means on said carriage including a transverse rod formed with a plurality of predetermined engagement positions for articles respectively headed for said destinations, said engagement positions being transversely spaced with reference to said path;

holders emplaceable on said rod in any of said engagement positions, each holder being adapted to carry at least one article;

retrieval means at each destination aligned with the respective engagement position for automatically releasing a corresponding holder from said rod upon movement of said transporter past said retrieval means;

guide means at each destination juxtaposed with said retrieval means for directing a released holder to a receiving station; and hook means on each holder fitting onto said rod in a forwardly open position for disengagement by said retrieval means during continuous movement of said carriage;

said retrieval means including a magnet positioned for coaction with a ferromagnetic part of any of said holders suspended from said rod in an aligned engagement position, said magnet being provided with an electrical energizing circuit including an ancillary conductor extending alongside said supply conductor in the vicinity of said retrieval means and a pair of interconnected brushes on said carriage respectively positioned for contact with said supply conductor and said ancillary conductor for activating said magnet during travel of said carriage past said retrieval means.

28. A system for distributing various articles to a number of destinations, comprising:

track means forming a path leading past all said destinations;

at least one transporter movable along said path;

support means on said transport including a transverse rod formed with a plurality of predetermined engagement positions for articles respectively headed for said destinations, said engagement positions being transversely spaced with reference to said path;

holders emplaceable on said rod in any of said engagement positions, each holder being adapted to carry at least one article;

a fixed stop at each destination aligned with the respective engagement position for releasing a corresponding holder from said rod upon movement of said transporter past said stop;

guide means at each destination juxtaposed with said stop for directing a released holder to a receiving station;

hook means on each holder fitting onto said rod in a forwardly open position for disengagement by said stop during continuous movement of said transporter; and a magnet on said stop positioned for coaction with a ferromagnetic part of any of said holders suspended from said rod in an aligned engagement position, said magnet being provided with an electrical energizing circuit including switch means closable by said transporter during travel thereof past said stop.

29. A system for distributing various articles to a number of destinations, comprising:

track means forming a path leading past all said destinations;

at least one transporter movable along said path;

support means including a transverse rod formed with a plurality of predetermined engagement positions for articles respectively headed for said destinations, said engagement positions being transversely spaced with reference to said path;

holders emplaceable on said rod in any of said engagement positions, each holder being adapted to carry at least one article;

retrieval means at each destination aligned with the respective engagement position for automatically releasing a corresponding holder from said rod upon movement of said transporter past said retrieval means;

guide means at each destination juxtaposed with said retrieval means for directing a released holder to a receiving station; and hook means on each holder fitting onto said rod in a forwardly open position for disengagement by said retrieval means during continuous movement of said transporter, said hook means including an upright, an elbow with a depending front arm articulated to the top of said upright, latch means on said upright normally keeping said elbow in a generally horizontal position overhanging said rod upon suspension of the holder from said rod, and a forwardly pointing release member operatively coupled with said latch means for allowing said elbow to swing upwardly and lift said front arm off said rod upon contact of said release member with a stationary element forming part of said retrieval means.

30. A system as defined in claim 29 wherein each holder comprises a bracket underneath said hook means and a roller journaled in said bracket for rotation about an axis which is substantially transverse to said rod upon engagement of said rod by said upright and said elbow, said roller having a tubular shaft traversed by said release member, said guide means comprising a bar substantially transverse to said path disposed below the level of said bracket for intercepting said roller upon disengagement of said elbow from said rod.

31. A system as defined in claim 30 wherein said bracket is at least partly ferromagnetic, said retrieval means including an electromagnet energizable upon the approach of said transporter for temporarily immobilizing an aligned holder upon release thereof from said rod with said roller overlying said bar.

32. A system for distributing various articles to a number of destinations, comprising:

track means forming a path leading past all said destinations;

at least one transporter movable along said path;

support means on said transporter including a transverse rod formed with a plurality of predetermined engagement positions for articles respectively headed for said destinations, said engagement positions being transversely spaced with reference to said path;

holders emplaceable on said rod in any of said engagement positions, each holder being adapted to carry at least one article;

retrieval means at each destination aligned with the respective engagement position for automatically releasing a corresponding holder from said rod upon movement of said transporter past said retrieval means;

guide means at each destination juxtaposed with said retrieval means for directing a released holder to a receiving station;

hook means on each holder fitting onto said rod in a forwardly open position for disengagement by said retrieval means during continuous movement of said transporter, each holder being provided beneath said hook means with a mounting for at least one article to be transported; and clamping means on each holder for pressing such an article against said mounting, said clamping means being provided with an extension projecting toward said hook means for preventing engagement thereof with said rod in an inoperative position of said locking means.

* * * * *